United States Patent
Ashcraft et al.

(10) Patent No.: US 8,724,306 B2
(45) Date of Patent: May 13, 2014

(54) HINGE ASSEMBLY

(75) Inventors: Britt C Ashcraft, Tomball, TX (US);
Peter M On, Houston, TX (US);
Michael Delpier, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 329 days.

(21) Appl. No.: 13/233,383

(22) Filed: Sep. 15, 2011

(65) Prior Publication Data

US 2013/0070406 A1  Mar. 21, 2013

(51) Int. Cl.
*H05K 7/00* (2006.01)

(52) U.S. Cl.
USPC ............. 361/679.27; 361/679.28; 455/575.3; 379/433.13; 16/221; 16/366; 16/370; 16/373

(58) Field of Classification Search
USPC ............... 361/679.27, 679.28; 455/575.3; 379/433.13; 16/221, 366, 370, 373
See application file for complete search history.

(56) References Cited

U.S. PATENT DOCUMENTS

| | | | |
|---|---|---|---|
| 6,484,016 B1 * | 11/2002 | Cheon | 455/90.1 |
| 6,530,784 B1 * | 3/2003 | Yim et al. | 439/31 |
| 6,779,234 B1 * | 8/2004 | Lu et al. | 16/340 |
| 7,377,034 B2 | 5/2008 | Thomason | |
| 7,463,481 B2 | 12/2008 | Lev et al. | |
| 8,477,505 B2 * | 7/2013 | Samuels et al. | 361/728 |
| 2002/0042971 A1 * | 4/2002 | Liao | 16/342 |
| 2004/0058582 A1 * | 3/2004 | Wendling et al. | 439/582 |
| 2005/0076474 A1 * | 4/2005 | Lu et al. | 16/280 |
| 2005/0266901 A1 * | 12/2005 | Pan | 455/575.3 |
| 2006/0029218 A1 * | 2/2006 | Lu et al. | 379/433.13 |
| 2007/0151079 A1 * | 7/2007 | Lu et al. | 16/337 |
| 2008/0040887 A1 * | 2/2008 | Dickerson | 16/342 |
| 2008/0109993 A1 * | 5/2008 | Myeong | 16/277 |
| 2010/0088853 A1 | 4/2010 | Degner et al. | |
| 2011/0085289 A1 | 4/2011 | Park et al. | |

* cited by examiner

*Primary Examiner* — Hung S Bui
*Assistant Examiner* — James Wu

(57) ABSTRACT

Example embodiments disclosed herein relate to a hinge assembly. An example of the hinge assembly includes a pair of active hinges and a pair of passive hinges. The hinge assembly may be utilized in portable computing devices such as notebook computers and personal digital assistants (PDAs).

13 Claims, 4 Drawing Sheets

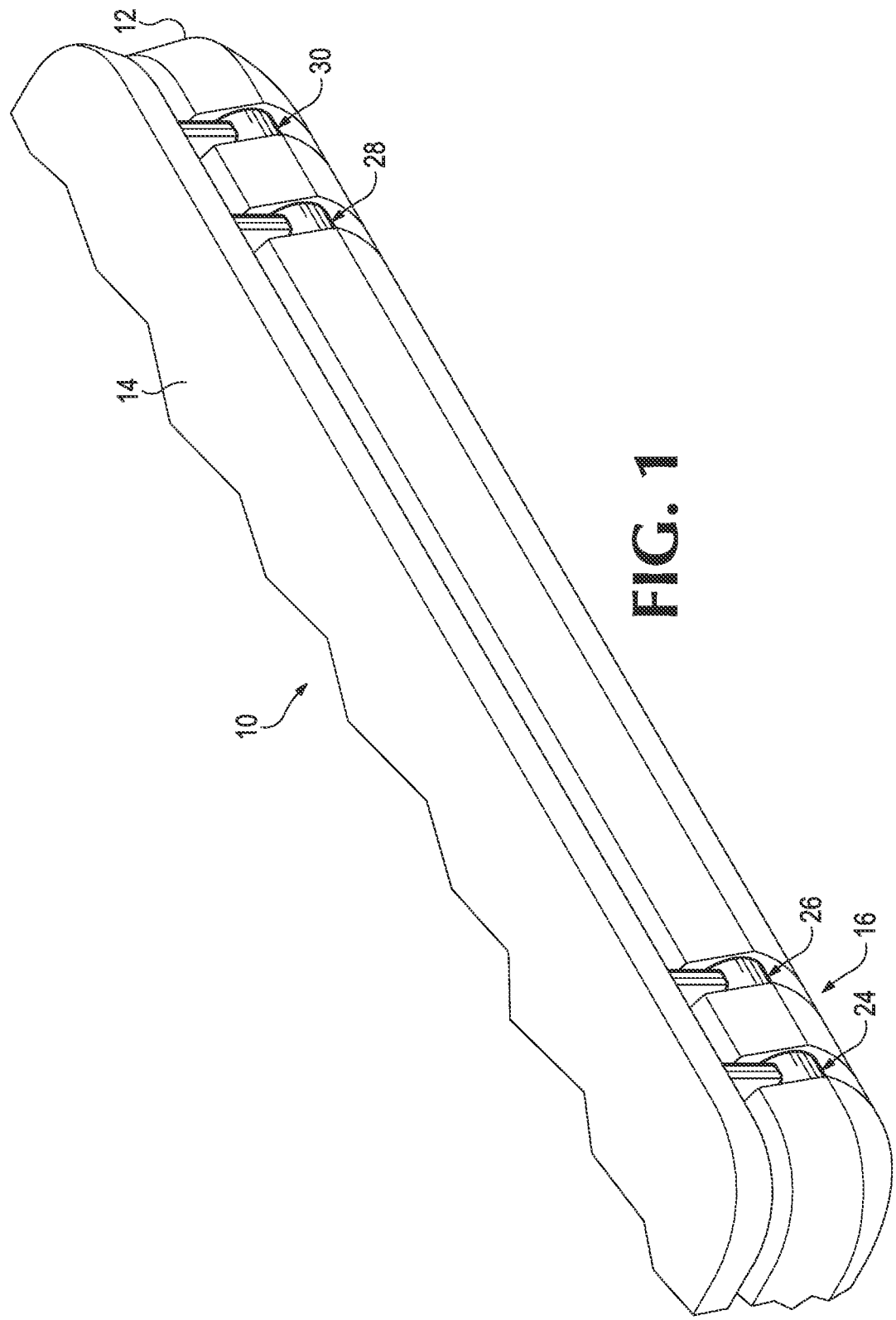

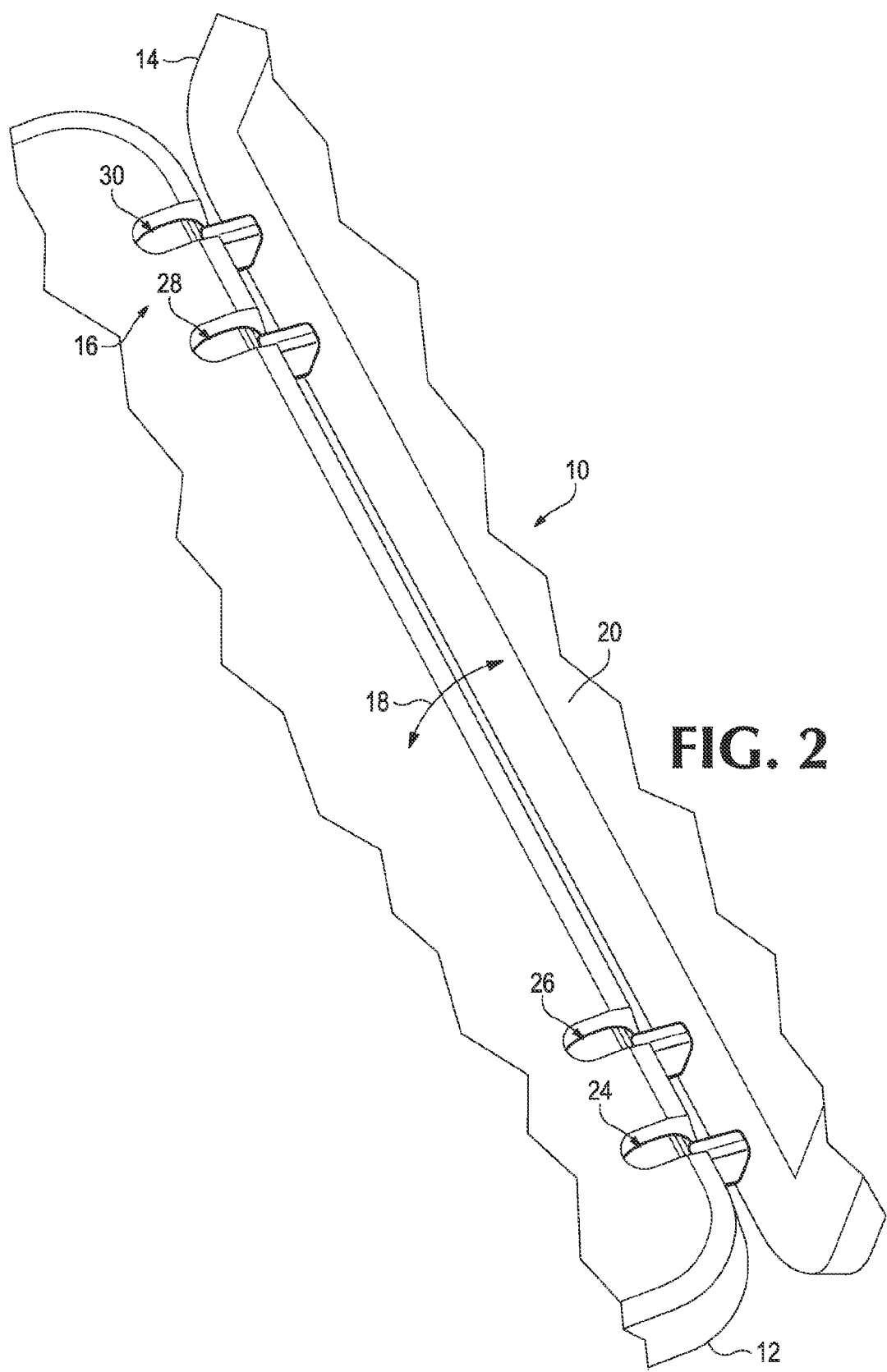

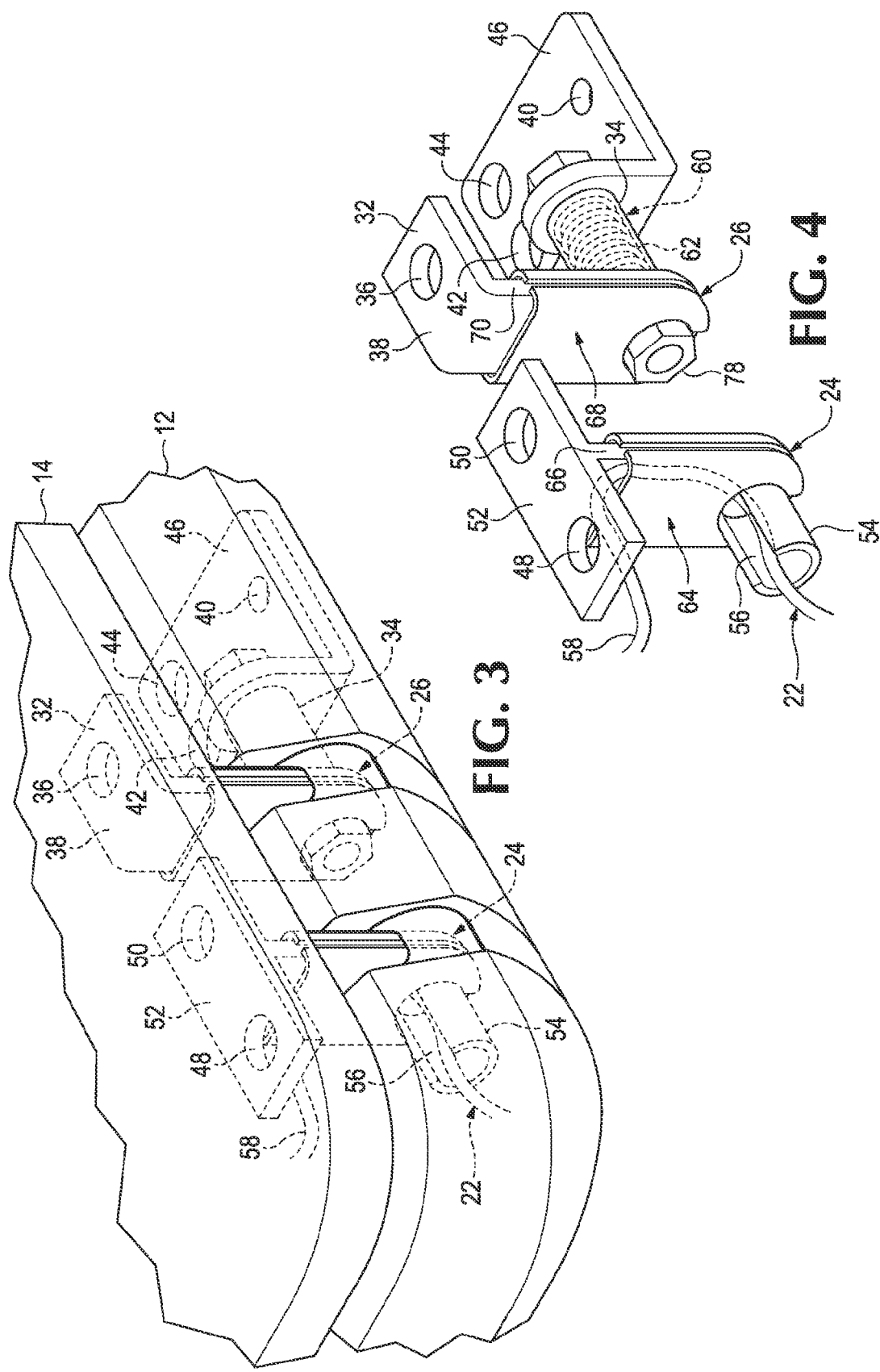

HINGE ASSEMBLY

BACKGROUND

A challenge exists for businesses to provide portable computing devices that are multi-featured yet still cost competitive. An additional challenge exists for businesses to keep pace with innovation by updating their computing devices with improved technology as it becomes available. A further challenge exists for businesses to design these devices in ways that help differentiate them in the marketplace from those of their competitors.

BRIEF DESCRIPTION OF THE DRAWINGS

The following detailed description references the drawings, wherein:

FIG. 1 shows a perspective view of an example of a quadruple hinge assembly and a portable computing device.

FIG. 2 shows a perspective view of an example of the quadruple hinge assembly and portable computing device of FIG. 1 with the display fixed at a position within an angular range.

FIG. 3 shows a perspective view of a portion of the quadruple hinge assembly and portable computing device of FIGS. 1 and 2.

FIG. 4 shows a perspective view of an example of a portion of the quadruple hinge assembly of FIGS. 1-3 outside of the computing device.

DETAILED DESCRIPTION

Figure 5:
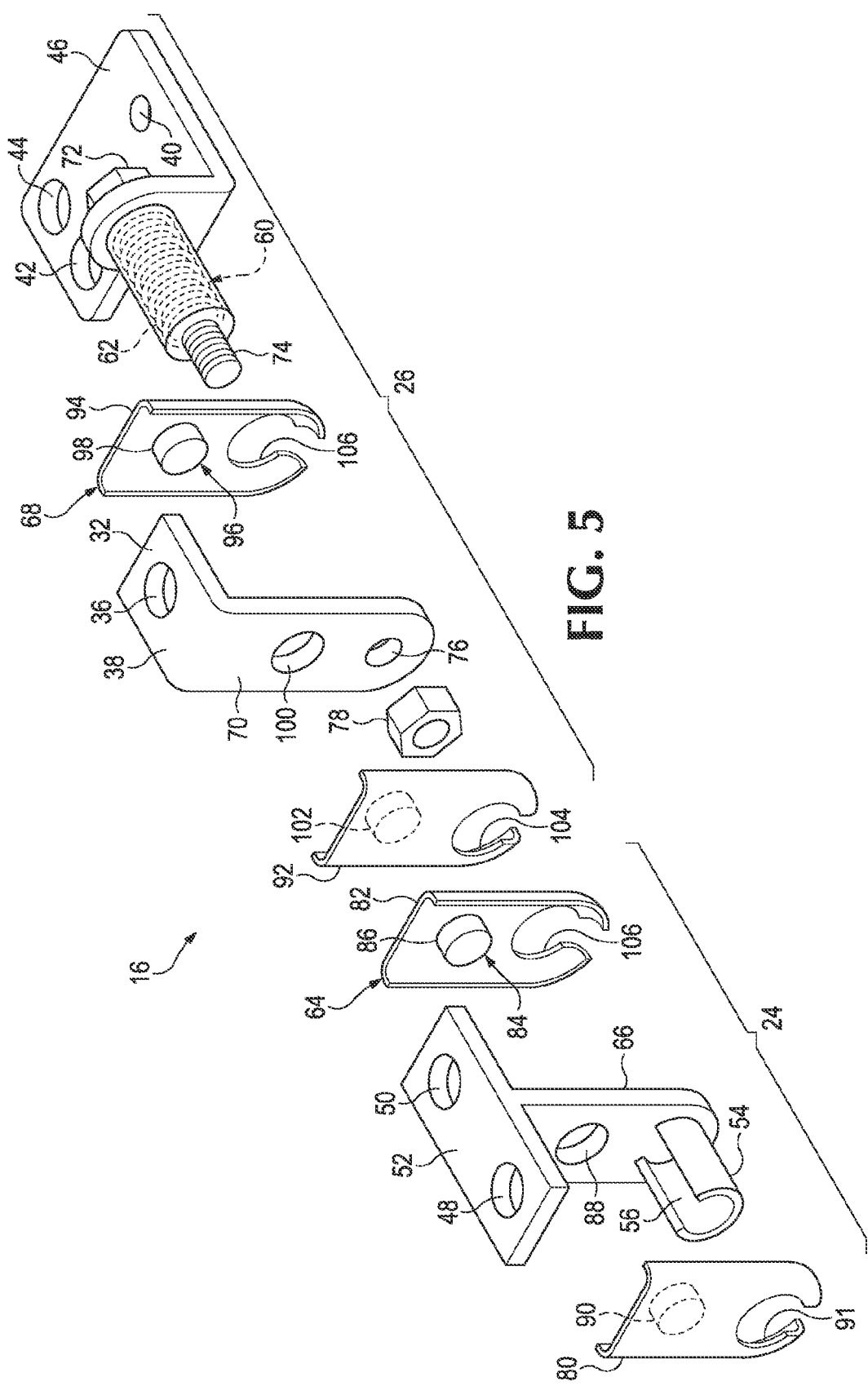
FIG. 5 is an exploded perspective view of an example of the portion of the quadruple hinge assembly illustrated in FIG. 4.

Portable computing devices, such as notebook computers and personal digital assistants (PDAs), are broadly utilized. These devices generally support a variety of applications such as e-mail and calendars. Some even include additional components such as telephones and cameras.

An example of a portable computing device 10 in accordance with the present invention is shown in FIG. 1. As can be seen in FIG. 1, computing device 10 includes a base unit 12 and a display 14. Base unit 12 houses a microprocessor, hard drive, keyboard, etc. (none of which are shown) and is coupled to display 14 via one or more cables or wires (not shown in FIG. 1) to provide data and control information between the two. Display 14 shows text and images for an end user. A quadruple hinge assembly 16 is coupled to base unit 12 and display 14, and is configured to permit rotation of display 14 through an angular range 18 relative to base unit 12, as generally shown in FIG. 2, upon application of a manual predetermined force. In the illustrated example, angular range 18 is selected to be between zero degrees and at least ninety degrees. Quadruple hinge assembly 16 is additionally configured to fix display 14 at a position 20 within angular range 18 by applying a torsive resistance that opposes rotation of display 14 relative to base unit 12 for forces less than the manual predetermined force. Quadruple hinge assembly 16 is further configured to define a plurality of cable or wire passageways 22 (e.g., see FIG. 3) between base unit 12 and display 14, as discussed in more detail below.

As can be seen in FIGS. 1 and 2, quadruple hinge assembly 16 includes four hinge assemblies 24, 26, 28, and 30. In the example quadruple hinge assembly 16 illustrated in FIGS. 1 and 2, hinge 24 functions as a first passive hinge, hinge 26 functions as a first active hinge, hinge 28 functions as a second passive hinge, and hinge 30 functions as a second active hinge. The characteristics of respective first and second active hinges 26 and 30, as well as respective first and second passive hinges 24 and 28 are discussed in more detail below.

A perspective view of a portion of the quadruple hinge assembly 16 and portable computing device 10 is illustrated in FIG. 3. As can be seen, one of the active hinges (hinge 26) and one of the passive hinges (hinge 24), are illustrated in FIG. 3. A first hinge mount 32 is coupled to first longitudinal axis 34 of first active hinge 26. First active hinge 26 is configured to produce a resistive force that opposes rotation of first hinge mount 32 about first longitudinal axis 34. First hinge mount 32 is coupled to display 14 via a fastener (not shown) that is disposed through opening 36 of plate portion 38. First active hinge 26 is coupled to base unit 12 via fasteners (also not shown) that are disposed through openings 40, 42, and 44 of plate portion 46.

First passive hinge 24 is coupled to display 14 via, fasteners (not shown) that are disposed through openings 48 and 50 of plate portion 52. First passive hinge 24 is coupled to base unit 12 via first post 54 that is configured to define a first passageway 56 for routing of first wire or cable 58 from base unit 12 to display 14. Although not shown in FIG. 3, it is to be understood that second passive hinge 28 and second active hinge 30 include the same components and function in the same manner as respective first passive hinge 24 and first active hinge 26.

FIG. 4 illustrates a perspective view of a portion of quadruple hinge assembly 16, namely first passive hinge 24 and first active hinge 26, outside of computing device 10. As can be seen in FIG. 4, first active hinge 26 includes a resilient member 60 that is coupled to first longitudinal axis 34 and provides the torsive resistance described above. In the example shown in FIG. 4, resilient member 60 includes a torsion spring 62. As can also be seen in FIG. 4, first passive hinge 24 also includes a cap assembly 64 coupled to upright member 66 (as described in more detail below in connection with FIG. 5) and configured to cover a portion of first wire or cable 58 outside of first passageway 56. A similar cap assembly 68 is coupled to upright member 70 of first hinge mount 32, as also described in more detail below in connection with FIG. 5.

FIG. 5 is an exploded perspective view of an example of the portion of quadruple hinge assembly 16 illustrated in FIG. 4. As can be seen in FIG. 5, first hinge mount 32 is coupled to first active hinge 26 by a fastener 72, the threaded shaft 74 of which is disposed through opening 76 of upright member 70 and secured by nut 78. Cap assembly 64 includes a first portion 80 and a second portion 82. Cap assembly 64 is configured to include a snap assembly 84 that couples first and second portions 80 and 82 to upright member 66. Snap assembly 84 includes a post 86 that is disposed through opening 88 of upright member 66 into receiving portion 90. As can also be seen in FIG. 5, first post 54 is disposed through cut-out or opening 91 in first portion 80.

Cap assembly 68 includes a first portion 92 and a second portion 94. Cap assembly 68 is configured to include a snap assembly 96 that couples first and second portions 92 and 94 to upright member 70. Snap assembly 96 includes a post 98 that is disposed through opening 100 of upright member 70 into receiving portion 102. As can also be seen in FIG. 5, nut 78 is disposed through cut-out or opening 104 in first portion 92 and threaded shaft 74 is disposed through cut-out or opening 106 in second portion 94.

Although several examples have been described and illustrated in detail, it is to be clearly understood that the same are intended by way of illustration and example only. These examples are not intended to be exhaustive or to limit the invention to the precise form or to the exemplary embodiments disclosed. Modifications and variations may well be apparent to those of ordinary skill in the art. For example, although a single first wire or cable 58 has been illustrated, it can represent more than one cable, wire or plurality of conductors. As another example, angular range 18 can be selected to include other ranges, such as between zero and one hundred eighty degrees. The spirit and scope of the present invention are to be limited only by the terms of the following claims.

Additionally, reference to an element in the singular is not intended to mean one and only one, unless explicitly so stated, but rather means one or more. Moreover, no element or component is intended to be dedicated to the public regardless of whether the element or component is explicitly recited in the following claims.

What is claimed is:

1. A computing device comprising:
    a base unit comprising a rear edge comprising spaced vertical channels extending forwardly into the rear edge, the spaced vertical channels comprising a first vertical channel and a second vertical channel;
    a display;
    a quadruple hinge assembly pivotally coupling the display to the base unit, the quadruple hinge assembly comprising:
    a first hinge mount having a first upright member;
    a first active hinge to which the first hinge mount is coupled and configured to produce a resistive force that opposes rotation of the first hinge mount about a the first longitudinal axis, wherein the first upright member perpendicularly extends from the first active hinge and is coupled to the display;
    a first passive hinge extending, within and across the first channel, along the first longitudinal axis and having a first post configured to define a first passageway for routing a first wire, the first post coupled to the display by a second upright member perpendicularly extending from the first passive hinge at a first location within the first channel and coupled to the display at a second location beyond the first channel;
    a second hinge mount having a third upright member;
    a second active hinge to which the second hinge mount is coupled and configured to produce a resistive force that opposes rotation of the second hinge mount about the second longitudinal axis, wherein the third upright member is coupled to the display; and
    a second passive hinge extending, within and across the second channel, along the second longitudinal axis and having a second post configured to define a second passageway for routing a second wire, the second post coupled to the display by a fourth upright member perpendicularly extending from the second passive hinge at a third location within the second channel and coupled to the display at a fourth location beyond the second channel.

2. The computing device of claim 1, wherein the quadruple hinge assembly further comprises a torsion spring coupled to the first longitudinal axis.

3. The computing device of claim 1, wherein the resistive force of the first active hinge is produced by a resilient member.

4. The computing device of claim 1, wherein the quadruple hinge assembly further comprises a cap assembly coupled to the second upright member of the first passive hinge and configured to cover a portion of second upright member to form a third passageway between the cap assembly and the second upright member, the third passageway receiving and guiding the first wire extending along the second upright member outside of the first passageway.

5. The computing device of claim 4, wherein the cap assembly is further configured to include a snap assembly that couples the cap assembly to the second upright member of the first passive hinge.

6. A computing device, comprising:
    a base unit;
    a display; and
    a quadruple hinge assembly coupled to the base unit and the display and configured to permit rotation of the display through an angular range relative to the base unit upon application of a manual predetermined force, fix the display at a position within the angular range through application of a torsive resistance that opposes rotation of the display relative to the base unit for forces less than the manual predetermined force, and to define a plurality of cable passageways between the base unit and the display, the quadruple hinge assembly comprising a plurality of cap assemblies coupled to the quadruple hinge assembly, wherein the base unit comprises a rear edge comprising spaced vertical channels extending forwardly into the rear edge, the spaced vertical channels comprising a first vertical channel and a second vertical channel and wherein the quadruple hinge assembly comprises:
    a first hinge mount having a first upright member;
    a first active hinge to which the first hinge mount is coupled and configured to produce a resistive force that opposes rotation of the first hinge mount about a first longitudinal axis, wherein the first upright member is coupled to the display;
    a first passive hinge extending, within and across the first channel, along the first longitudinal axis and having a first post configured to define a first passageway for routing a first wire, the first post coupled to the display by a second upright member perpendicularly extending from the first passive hinge at a first location within the first channel and coupled to the display at a second location beyond the first channel;
    a second hinge mount having a third upright member;
    a second active hinge to which the second hinge mount is coupled and configured to produce a resistive force that opposes rotation of the second hinge mount about a second longitudinal axis, wherein the third upright member is coupled to the display; and
    a second passive hinge extending, within and across the second channel, along the second longitudinal axis and having a second post configured to define a second passageway for routing a second wire, the second post coupled to the display by a fourth upright member perpendicularly extending from the second passive hinge at a third location within the second channel and coupled to the display at a fourth location beyond the second channel.

7. The computing device of claim 6, further comprising a resilient member coupled to the quadruple hinge and configured to provide the torsive resistance.

8. The computing device of claim 7, wherein the resilient member includes a torsion spring.

9. The computing device of claim 6, wherein each of the cap assemblies are configured to include a snap assembly the couples the cap assembly to the quadruple hinge assembly.

10. The computing device of claim 6, wherein the angular range is selected to be between zero degrees and at least ninety degrees.

11. The computing device of claim 6, wherein the quadruple hinge assembly includes an active hinge that is configured to fix the display at the position within the angular range through application of the torsive resistance that opposes rotation of the display relative to the base for forces less than the predetermined force.

12. The computing device of claim 6, wherein the quadruple hinge assembly includes a plurality of passive hinges that define the plurality of cable passageways between the base unit and the display.

13. The computing device of claim 6, wherein the quadruple hinge assembly further comprises a cap assembly coupled to the second upright member of the first passive hinge and configured to cover a portion of second upright member to form a third passageway between the cap assembly and the second upright member, the third passageway receiving and guiding the first wire extending along the second upright member outside of the first passageway.

* * * * *

UNITED STATES PATENT AND TRADEMARK OFFICE
CERTIFICATE OF CORRECTION

| | | |
|---|---|---|
| PATENT NO. | : 8,724,306 B2 | Page 1 of 1 |
| APPLICATION NO. | : 13/233383 | |
| DATED | : May 13, 2014 | |
| INVENTOR(S) | : Britt C Ashcraft et al. | |

It is certified that error appears in the above-identified patent and that said Letters Patent is hereby corrected as shown below:

In the Claims:

In column 3, line 30, in Claim 1, delete "a the" and insert -- the --, therefor.

In column 4, line 63, in Claim 9, delete "the" and insert -- that --, therefor.

Signed and Sealed this
Nineteenth Day of August, 2014

Michelle K. Lee
*Deputy Director of the United States Patent and Trademark Office*